United States Patent [19]  [11]  4,299,979
Murphy  [45]  Nov. 10, 1981

[54] POLYMERIZABLE MONOETHYLENIC CARBOXYLIC ACIDS WHICH DECARBOXYLATE ON HEATING

[75] Inventor: Edward J. Murphy, Mt. Prospect, Ill.

[73] Assignee: DeSoto, Inc., Des Plaines, Ill.

[21] Appl. No.: 50,645

[22] Filed: Jun. 21, 1979

[51] Int. Cl.$^3$ ............... C07C 125/065; C07C 103/66
[52] U.S. Cl. ................................ 562/561; 560/159; 260/501.11; 526/301; 526/304; 106/287.25
[58] Field of Search ............... 560/159; 260/501.11; 562/561

[56] References Cited

U.S. PATENT DOCUMENTS

| | | | |
|---|---|---|---|
| 2,699,427 | 1/1955 | Smith | 562/561 |
| 2,777,772 | 1/1957 | Drake | 560/169 |
| 3,056,832 | 10/1962 | Stromberg | 562/561 |
| 3,178,385 | 4/1965 | Dinges | 562/561 |
| 3,470,079 | 9/1969 | D'Alelio | 560/169 |
| 3,536,525 | 10/1970 | Kolb | 560/169 |
| 3,652,671 | 3/1972 | Barron | 562/561 |
| 3,751,451 | 8/1973 | Samour | |

OTHER PUBLICATIONS

Tanimoto, Chem. Abst.74: 88315t (1971).
Sanguigni, J. Med. Chem. 7, pp. 573–574 (1974).
Lusskin, J. Am. Chem. Soc. 72, 5577–5578 (1950).

*Primary Examiner*—Howard T. Mars
*Assistant Examiner*—Michael Shippen
*Attorney, Agent, or Firm*—Dressler, Goldsmith, Shore, Sutker & Milnamow, Ltd.

[57] ABSTRACT

Carboxy functional addition-polymerizable monoethylenically unsaturated monomers and their volatile amine salts are disclosed, along with addition copolymers useful in coatings prepared therefrom. Both monomers and polymers decompose on heating. The monomers are bisamides comprised of a monoethylenically unsaturated amide and malonic acid half amide joined through their amide functionalities by a divalent saturated aliphatic group having 1–4 carbon atoms.

5 Claims, No Drawings

POLYMERIZABLE MONOETHYLENIC CARBOXYLIC ACIDS WHICH DECARBOXYLATE ON HEATING

DESCRIPTION

1. Technical Field

This invention relates to polymerizable monoethylenic carboxylic acids which decarboxylate on heating, the production thereof, and polymers containing the same.

2. Background Art

Film forming polymers useful as coating compositions frequently possess carboxylic acid moieties to assist in the solubility or dispersibility of the polymers in water during and before application. However, the presence of carboxylic acid groups in the final product is detrimental because these groups are reactive and hydrophilic which impairs the durability and chemical resistance of the polymers and films, and coatings containing the same.

DISCLOSURE OF THE INVENTION

In accordance with the present invention, monoethylenically unsaturated, polymerizable carboxylic materials which decarboxylate on heating have the following structural formula:

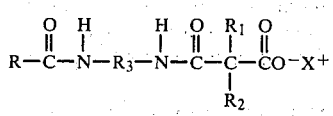

wherein R is a polymerizable monoethylenically unsaturated organic radical; $R_1$ and $R_2$ are selected from the group consisting of hydrogen and $C_1$–$C_4$ alkyl; $R_3$ is selected from the group consisting of $C_1$–$C_4$ divalent saturated aliphatic groups; and $X^+$ is selected from the group consisting of the proton and protonated volatile amines. When $X^+$ is a proton, the monomer is an acid and it decarboxylates when heated. When $X^+$ is a protonated volatile amine, the monomer is a salt. On heating, the amine evaporates which generates the acid which can then decarboxylate. It is also possible for the salt to decarboxylate directly.

One preferred structure has the following structural formula:

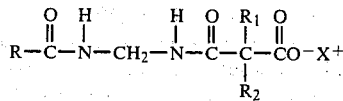

wherein R is selected from the group consisting of $H_2C=CH$— and

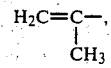

and $R_1$ and $R_2$ are the same as before, but are both the same to provide a symmetrical structure.

The polymerizable monoethylenically unsaturated carboxylic acids of the present invention are particularly significant because they can be prepared economically and in good yield by reacting a monoethylenically unsaturated secondary or tertiary N-alkanol or N-alkylol amide with a cyanoalkanoic acid in the presence of a Ritter catalyst comprising sulfuric acid.

The invention includes the monomers as well as addition copolymers containing these monomers, that is, copolymers having a carbonaceous backbone and side chains provided by the polymerized monomers of this invention in which the carboxyl functionality can be destroyed by heating. Carboxyl functional copolymers of monoethylenically unsaturated monomers which are stable in the acid form or in the form of salts with volatile amines but which release carbon dioxide on heating together with volatilization of the amine, if present, are particularly contemplated.

Polymeric coatings made in accordance with this invention, using the monomers disclosed herein, have improved water resistance, and when used on metal substrates, offer improved corrosion protection to the metal substrate. The improved resistance to aqueous liquids is obtained by the decarboxylation of the polymerized novel monomers of this invention. This decarboxylation is rapid at elevated temperatures above about 320° F. such as those used for baked-on coatings, which are typically from 350°–450° F. with holding for periods of from 30 to 10 minutes. The production of baked-on coatings is an important feature of this invention.

Both the monomers and polymers of this invention are more stable in alkaline medium, and tend to decarboxylate at elevated temperatures more readily under acidic conditions, so monomer and polymer salts with volatile bases are also particularly contemplated.

The novel polymerizable carboxylic acid monomers of this invention are bisamides, and are comprised of a monoethylenically unsaturated amide and a malonic acid half amide, joined through their amide functionalities by a divalent, saturated aliphatic group having one to four carbon atoms ($C_1$–$C_4$).

Referring to the above structural formula, wherein R is a polymerizable monoethylenically unsaturated organic radical, the portion of the novel polymerizable monomer of this invention referred to as the monoethylenically unsaturated amide is that portion of the monomer including

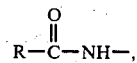

wherein the R group has polymerizable monoethylenic unsaturation.

Any monoethylenically unsaturated organic radical which allows polymerization of the resultant monomer is contemplated as the R group in the above-mentioned formula. These include allyloxy ($H_2C=CHCH_2O$—) and substituted allyloxy groups like

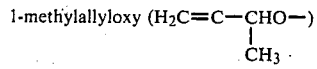

so that the unsaturated amide can be derived from allyl carbamate or 1-methylallyl carbamate, respectively. Preferably, the R group includes 1- or 2- substituted ethylenes so that the unsaturated amide can be derived from 2-ethylacrylic acid, crotonic acid, or the like. As a result of the selection, the monoethylenic unsaturation is conjugated with the amide carbonyl, as is preferred.

Most preferably, the R group is vinyl ($H_2C=CH-$) or

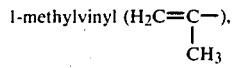

thereby making the monoethylenically unsaturated amide a derivative of acrylic acid or methacrylic acid, respectively. Starting materials based upon both acrylic and methacrylic acids, which are discussed hereinbelow, are readily available, and the resultant novel monomers prepared therefrom copolymerize easily to form the novel polymers of this invention. The preferred monoethylenic materials containing an unsaturated amide,

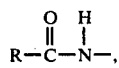

contains 3–4 carbon atoms and the conjugation is alpha, beta.

The malonic acid half amide (malonamic acid),

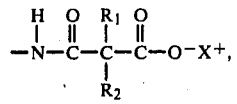

portion of the monomers of of this invention may be derived from a 2-cyanoalkanoic acid, such as cyanoacetic acid, and its ester derivatives, by the Ritter reaction, discussed below. The $R_1$ and $R_2$ groups may be hydrogen or $C_1$–$C_4$ alkyl groups. Thus, cyanoacetic acid, 2-cyano-2-methyl butanoic acid, 2-cyanohexanoic acid and the like are contemplated starting materials in this invention.

In preferred practice both $R_1$ and $R_2$ are the same to provide a symmetrical structure to the malonamic acid portion of the monoethylenic monomer. Cyanoacetic acid, 2-cyano-2-methylproprionic acid and the like are therefore preferred starting materials. Cyanoacetic acid is most preferred.

Esters of the above 2-cyanocarboxylic acids, such as ethyl cyanoacetate, methyl 2-cyano-2-methylpropionate and the like are also contemplated starting materials for use in this invention. However, these materials are usually themselves more costly than the corresponding free acids, and must be hydrolyzed in an additional process step to yield the desired malonamic acid compound, and therefore are not preferred starting materials.

The above described two portions of the polymerizable monoethylenically unsaturated carboxylic acids of this invention are joined or linked through their amide functionalities by a divalent, saturated aliphatic group having 1-4 carbon atoms, $R_3$. The $R_3$ group may therefore be methylene, $-CH_2-$, ethylene, $-CH_2-CH_2-$, trimethylene $-(CH_2)_3-$, and the like, as well as their alkyl substituted derivatives, such as propylene,

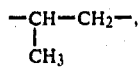

and the like, except that $R_3$ is limited to containing about four carbon atoms.

In preferred practice, this divalent saturated aliphatic group is derived from a $C_1$-$C_4$ aliphatic aldehyde, such as acetaldehyde, propionaldehyde and the like, via an N-alkylol amide intermediate formed from the condensation of the aldehyde and an unsaturated amide such as acrylamide.

Using formaldehyde as the starting material for the linking or joining group, $R_3$ would be methylene, $-CH_2-$. Similarly, if propionaldehyde were used as the basis for the joining group, $R_3$ would be propylidene,

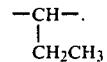

Most preferably, the N-alkylol amide is derived from formaldehyde which yields N-methylol amide derivatives. Thus, in most preferred practice, formaldehyde is reacted with acrylamide or methacrylamide to form the resulting N-methylol adduct (e.g., N-methylolacrylamide) which is then reacted with the cyanoacetic acid derivative to yield the desired monoethylenically unsaturated polymerizable carboxylic acid monomer. Using N-methylol acrylamide and cyanoacetic acid as starting materials, the product is acrylamidomethylmalonamic acid. When N-methylol methacrylamide and cyanoacetic acid are used as starting materials, the product is methacrylamidomethylmalonamic acid. These two monoethylenically unsaturated malonamic acids are the most preferred decarboxylatable monomers of this invention.

The $R_3$ group may also have its origin in compounds other than N-alkylol amides. As an example, a secondary or tertiary N-alkanol amide, containing up to four carbon atoms in the alkanol chain such as N-isopropanolacrylamide [N-(2-hydroxypropyl)acrylamide] or the like, can be used as a starting material for the monoethylenically unsaturated amide and $R_3$ portions of the monomer. Using N-iso-propanolacrylamide, the $R_3$ group would have the structure

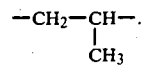

The monoethylenically unsaturated polymerizable carboxylic acid monomers of this invention are prepared by a Ritter reaction between a secondary or tertiary N-alkanol amide or, preferably, an N-alkylol amide and a 2-cyanoalkanoic acid in the presence of a Ritter catalyst comprising sulfuric acid to yield a second amide bond in the newly formed molecule. The monomers thereby have a bisamide structure.

Ritter reactions have been used to prepare acrylamide derivatives using N-methylol acrylamide as a reactant, but not with cyanoacetic acid as a coreactant. [Chem. Abs, Vol. 74: 88315t (1971).] Additionally, this reaction has been used to prepare malonamide products from cyanoacetic acid and ethyl cyanoacetate, but these do not have the monoethylenically unsaturated bisamide structure of this invention. [J.Med.Chem. 7,573 (1964) and J.Am.Chem.Soc. 72, 5577 (1950)] Thus, while portions of the polymerizable carboxylic acid monomers of the present invention have been prepared previously, there is neither teaching nor suggestion in the art of reacting cyanoacetic acid with an unsaturated N-alkanol or N-alkylol amide as previously described to produce polymerizable unsaturated carboxylic acids. These carboxylic acids are unusual because they are polymerizable, but still decarboxylate on heating.

Using N-methylol acrylamide and cyanoacetic acid as illustrative, the polymerizable monoethylenically unsaturated carboxylic acid monomer of this invention may be prepared by first dissolving by cyanoacetic acid in a solvent, preferably sulfuric acid. N-methylol acrylamide is then added slowly in the presence of a Ritter catalyst, preferably the sulfuric acid just referred to. The reaction mixture is agitated and kept below about 40° C., preferably at about 30° C., until completion. Upon completion of the reaction, the mixture is poured into ice water, and the precipitate collected and purified as desired. An example of a preparation using these starting materials is given hereinafter in Example 1. This Ritter reaction is desirably carried out in the substantial absence of water.

Ritter catalysts comprise sulfuric acid and may also contain additional catalysts such as $BF_3$-etherate. Acids such as acetic acid may be used as part of the solvent and/or catalyst system. In preferred practice, concentrated sulfuric acid is used both as a Ritter catalyst and a solvent for cyanoacetic acid. When first contacted with the nitrile-containing reactant, the sulfuric acid should contain less than about 8 weight percent water, and is preferably about 98 percent water free.

While the polymerizable carboxylic acids of this invention decarboxylate at elevated temperature, the salts of these acids with volatile amines tend to be more stable at elevated temperatures. Any volatile amine can be used, and these may be primary, secondary or tertiary amines as desired, and as is well-known. Examples of such volatile amines include monoethanolamine, diisopropanolamine, dimethylethanolamine, ammonia, triethylamine and the like.

The volatile amine salts of the polymerizable carboxylic acids of this invention, and the copolymers derived therefrom, may be prepared by means well-known in the art. Thus, for example, the amine salt may be prepared from a mixture of the carboxylic acid and the amine and then isolated and used, or a mixture of the volatile amine, the polymerizable, decarboxylatale monomer and other monomers may be added together and polymerized, or the monomer polymerized below its decarboxylation temperature and the resultant polymeric acid neutralized with volatile amine, or the like.

Polymers prepared from the novel monomers of this invention have several uses in the coating arts. The monomers described hereinabove are particularly useful for preparing those coatings wherein a carboxylic acid functionality, or its salt, is needed for improved solubility or dispersibility in a medium, such as water, but which carboxylic acid functionality tends to make the coating film water sensitive after application.

The polymers of this invention prepared from the polymerizable monoethylenically unsaturated monomers as described hereinabove decarboxylate to yield carbon dioxide and a less water sensitive, hydrophobic coating on heating. The monomer whose preparation was described hereinabove and in Example 1 decarboxylates at a temperature of about 320° F. (160° C.). Similarly, when polymer coating films are made from the monomers of this invention, and such films are heated to about 160° C., they too lose carbon dioxide and thereby gain in their stability toward later interactions with water and serve to protect their coated substrates from the effects of water, such as corrosion.

The amount of the monomers of this invention which are used in copolymers can vary greatly. Based upon the weight of the free carboxylic acid, these monomers are typically used at 1 to about 60 percent by weight of the total monomers present, with preferred amounts being about 1 to about 20 percent of the weight of the total monomers present. The specific amount selected will vary with the desired polymer characteristics as is well-known.

The decarboxylatable carboxylic acid-containing monomers of this invention are particularly useful for making carboxylic acid-containing polymers where one amount of carboxylic acid functionality is desired during polymerization or dispersion and a smaller amount is desired for purposes such as adhesion of the cured films. In these polymers, although the decarboxylatable carboxylic acid-containing monomers of this invention may be used in whole or in part for this purpose, a less expensive monoethylenically unsaturated carboxylic acid, such as acrylic or methacrylic acid, may be used in conjunction with the monomers of this invention. With such mixtures, the amount of less expensive carboxylic acid monomer used is typically the amount of residual acid functionality desired, while the amount of decarboxylatable monomer of this invention used, is that amount which together with the amount of less expensive acid monomer gives the desired dispersion or solubility properties to the monomers or polymer.

The monoethylenically unsaturated polymerizable carboxylic acids and salts of this invention, either alone or together with other unsaturated carboxylic acid monomers, such as acrylic acid, are copolymerized with other monoethylenically unsaturated monomers as are customarily employed in acrylic or similar addition copolymers. Thus, vinyl aromatic monomers such as styrene and homologs thereof, such as vinyl toluene, are useful herein, as are monomers such as acrylonitrile, vinyl acetate, methacrylamide, and the like. Esters of acrylic and methacrylic acids or crotonic acid are also particularly desirable such as ethylacrylate, 2-ethylhexyl acrylate, dodecyl methacrylate, butyl crotonate and the like. It may further be desirable to prepare polymers including hydroxyl functional monomers such as 2-hydroxyethyl methacrylate and 2-hydroxypropyl acrylate which aid copolymer dispersion and which can cross-link with alkylol-type curing agents.

Additionally, small amounts of polyethylenically unsaturated monomers may be copolymerized so long as the final polymer produced is dispersible in a suitable solvent. Examples of such multiply unsaturated monomers include ethylene glycol dimethacrylate and trimethylolpropane trimethacrylate, and the like. Unsaturated fatty acid epoxy esters such as those prepared from the 9–11 castor fatty acids or tall oil fatty acids and bisphenol-type diglycidyl esters having epoxide equivalent weights of about 350 to 4000 are also useful herein.

The polymers of this invention may be prepared by typical addition polymerization techniques. These polymers may be prepared in aqueous emulsion, aqueous dispersion, or in solvent solution.

As a result of the above described addition copolymerization, the copolymers of this invention contain repeating units having the structural formulas of the polymerized monomers of this invention. Thus, these copolymers contain repeating units having the structural formula:

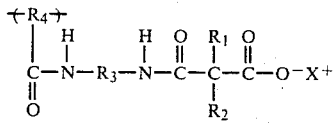

wherein $R_4$ is the polymerized, divalent form of the monoethylenically unsaturated radical previously defined as R; $R_1$ and $R_2$ are selected from the group consisting of hydrogen and $C_1$-$C_4$ alkyl, and are preferably the same; $R_3$ is selected from the the group consisting of $C_1$-$C_4$ saturated divalent aliphatic groups and is preferably —$CH_2$—; and $X^+$ is selected from the group consisting of the proton and protonated volatile amines.

Copolymers prepared from the most preferred monomers, namely, acrylamidomethylmalonamic acid or methacrylamidomethylmalonamic acid, or their salts, contain repeating units having the structural formula:

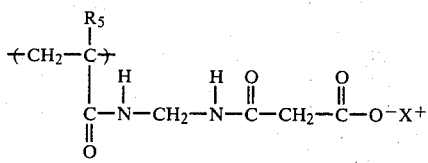

wherein $R_5$ is selected from the group consisting of methyl and hydrogen, and $X^+$ is selected from the group consisting of the proton and protonated volatile amines.

Copolymers, with the repeating units described by the above two structural formulas, have the repeating units present at about 1 to about 60 percent of the weight of the copolymer, calculated as free acids. Preferably, these repeating units make up about 1 to about 20 percent of the weight of the copolymer, calculated as free acids.

Although the free acid form of the monomers of this invention may be used during polymerization, it is preferred that the monomers be present during and after polymerization as salts with volatile amines. This is because the polymerizations are normally carried out at elevated temperature, and unless the carboxyl functional monomer is in its salt form, it may decarboxylate, thereby prematurely losing the desired carboxyl functionality. Of course, should the polymerization be carried out at a temperature below which decarboxylation of the free carboxylic acid form of the monomer does not occur to a significant extent (i.e., less than about 5 percent), the monomer need not be neutralized prior to polymerization. Thus, while it is not preferred, the monomer need not be preneutralized, but may also be prepared and used in its acid form or prepared as an acid and neutralized at some later time.

U.S. Pat. Nos. 3,862,075 and 4,005,052, both to K. Sekmakas, relate to copolymers whose monomers are comprised of about 1 to 30 percent of monoethylenically unsaturated carboxylic acid functional monomers, which are polymerized in the presence of a polyhydric alcohol and which may be cured in the presence of aminoplast resins. In these patents, the carboxylic acid functionality serves in part to aid the stability of the dispersions which are formed during polymerization and thereafter. Additionally, the acidic copolymers are partially neutralized with volatile bases to again, in part, assist the stability of the system. On curing, the aminoplast resin may react both with the alcohol functionality present as well as with the carboxylic acid functionality present to cross-link or cure the coating composition. However, not all of the acid functionality is consumed in cross-linking, thereby leaving some unreacted acid which can cause undesirable properties when the cured coatings are later exposed to water or aqueous liquid. By substituting the monomers of the present invention for part of the monoethylenically unsaturated carboxylic acid functional monomers described in these patents, the coatings resulting after cure become less sensitive to water, presumably due to the above described heat induced decarboxylation.

Polymers containing carboxylic acid groups are also frequently used for electrodepositing coatings from an aqueous bath at the anode. In such systems, the carboxylic acid moiety, or more properly the carboxylate moiety, is used to provide dispersability and a negative electrical charge to the water-dispersed polymer so that the polymer will be deposited from the dispersion onto the positively charged anode to form a coating thereon. Such electrodeposition compositions usually contain less than about 20 percent of resin solids and are frequently cured with heat while in admixture with aminoplast resins. Examples of such systems may be found in U.S. Pat. Nos. 4,075,133 to K. Sekmakas and R. Shah and 4,076,667 to K. Sekmakas. Replacement of some or all of the monoethylenically unsaturated carboxylic acid monomer used in these patents with the monomers of the present invention achieves a similarly negatively charged water dispersible copolymer which electrodeposits at the anode, but the modified copolymer shows improved resistance to corrosion of the underlying metal substrate and to chemical attack after curing.

United States Patent Application Ser. No. 844,021 to K. Sekmakas and R. Shah discloses improved aqueous electrocoating compositions based upon epoxy ester copolymers which contain residual unsaturation to enable an oxidative cure, and which also include a condensed phenolic resin so that curing temperature is minimized at the same time that resistance to salt spray and detergents are improved. These polymers contain copolymerized monoethylenically unsaturated monomers having terminal ethylenic unsaturation and carboxyl functionality which, when neutralized, aids in the solubility of the resulting copolymer. These polymer coatings are typically applied at about 10 weight percent solids. Replacement of some of the monoethylenically unsaturated monomers containing terminal ethylenic unsaturation and carboxyl functionality with the monomers of the present invention, and subsequent copolymerization yields acidic copolymers in accordance with the present invention which release carbon dioxide on heating to further improve the resistance of these coatings to salt spray and detergents.

BEST MODES FOR CARRYING OUT THE INVENTION

Example 1: Preparation of Acrylamidomethylmalonamic Acid

A 500 ml. reactor equipped with mechanical stirrer, nitrogen inlet, condenser, thermometer and addition funnel is charged with 102.0 grams (1.2 equivalents) of cyanoacetic acid and 225.0 grams (2.2 equivalents) of concentrated sulfuric acid. Stirring is begun and nitrogen is blanketed over the stirred solution. The reactor is then placed in a water bath to provide temperature control. Upon dissolution of the cyanoacetic acid, the solution temperature is adjusted to 25° C. and 101.0 grams (0.6 equivalents) of a 60 percent by weight active aqueous solution of N-methylol acrylamide is added dropwise through the addition funnel while agitation continues. The rate of addition and water bath temperature are adjusted so that the reacting materials are maintained at 30° C.±2° C. The addition takes approximately 1.5 hours. After completion of the N-methylol acrylamide addition, the reacting materials are maintained at 30° C.±2° C. with agitation for an additional 1.5 hours for the completion of the reaction.

After the reaction is completed, the reaction mixture is poured into approximately 1500 ml. of an ice/water mixture whereupon the product, acrylamidomethylmalonamic acid, precipitates. The precipitate containing slurry is then filtered and washed in succession with two 200 ml. portions of cold, de-ionized water and one 200 ml. portion of cold methanol, followed by one 200 ml. portion of cold ethyl ether. The resultant filter cake is then placed in a suitable container and vacuum dried at room temperature for about 4 hours to give a yield of 40% to 60% of the desired monoethylenically unsaturated carboxylic acid which is between about 95% and 98% pure.

Structural confirmation has been ascertained by both proton and carbon nuclear magnetic resonance spectroscopy and by acid value titration. Thermal gravimetric analysis indicates a sharp decarboxylation temperature of 320° F. (160° C.).

Example 2: Heat Curable Copolymer Electrocoating Composition

| Charge (Grams) | Composition |
|---|---|
| 125 | Butanol |
| 250 | Deionized water |
| 2.5 | Benzoyl peroxide |
| 10 | An ionic surfactant (Note 1) |
|  | Charge to reactor and heat to 75° C. with agitation. |
| 27 | Triol (Note 2) |
| 150 | Iso-butyl acrylate |
| 215 | Ethyl acrylate |
| 100 | Hydroxyethyl acrylate |
| 10 | Acrylic acid |
| 50 | Monoethylenically unsaturated acid monomer of Example 1 |
| 2.5 | Benzoyl peroxide |
|  | Premix triol and monomers to provide a liquid mixture and add with agitation to reactor over a 3 hour period at 75° C. to 77° C. Hold for 1 hour. |
| 1.5 | Tertiary-butyl perbenzoate |
|  | Add catalyst and hold for one hour at 77° C. |
| 200 | Deionized water |
| 37 | Diisopropanolamine |
|  | Cool to 35° C. and add water and amine. |
| 155 | Deionized water |
|  | Add water and mix. |

Note 1:
An anionic surfactant such as that known under the trade name Sipex DS-10, a product of Alcolac, Inc. may be used.
Note 2:
A propylene oxide adduct of trimethylol propane having an average molecular weight of about 2540.

The product is a partially neutralized milky dispersion and is directly useful for maintaining the solids content of an electrocoating bath at a desired solids content, e.g., 9% by weight. The dispersion is fully neutralized by the excess amine present in the electrocoating bath. In the initial charge to the electrocoating bath, the product is diluted and fully neutralized with diisopropanolamine. Based on the total weight of polymer, the electrocoating bath includes 25% of American Cyanamide XM 1116, which is a methylated, ethylated, hexamethylol melamine.

The carboxyl functionality present in the electrocoated film due to the novel monomer of this invention is lost by decarboxylation during the heat cure of the resin film, thereby improving the resistance of the film to later attack by water.

Example 3: Aqueous Polymerization of Unsaturated Monomers Using Trihydric Alcohols To Produce Emulsifier-Free Dispersions

| Charge (Grams) | Compositions |
|---|---|
| 500 | Deionized water |
| 0.75 | Ammonium persulfate |
|  | Charge into reactor and heat to 90° C. Then prepare a monomer premix consisting of the following: |
| 170 | Styrene |
| 10 | Acrylic acid |
| 150 | Acidic monomer of Example 1 |
| 155 | Ethyl acrylate |
| 8 | Polyhydric alcohol (Note 1) |
| 83 | Triethylamine |
| 14 | Tertiary-dodecyl mercaptan |
|  | Prepare a catalyst premix consisting of: |
| 375 | Deionized water |
| 3 | Ammonium persulfate |
|  | Add the monomer premix and the catalyst premix solution to the reactor, simultaneously, over a 2½ hour period at 85–90° C. using fast speed agitation. When addition is complete, hold the temperature at 85° C. for an additional 90 minutes. Cool to 30° C. and neutralize with the following solution: |
| 14 | Dimethylethanolamine |
| 185 | Deionized water |

Note 1:
A liquid trihydric polyoxypropylene derivative of trimethylol propane having an average molecular weight of 2540, an hydroxyl number (KOH/g) of 63, and a viscosity at 25° C. of 440 centipoise.

The dispersion of Example 3 is blended with a water soluble hexamethoxymethyl melamine resin to provide a ratio of dispersion solids to hexamethoxymethyl melamine resin solids of 80:20. The coating composition so provided is then applied to aluminum panels using a wound-wire rod to deposit the wet coating having a thickness of about 0.5 mil. The coated panels are baked in an electric oven at 475° F. for 60 seconds to cure. The cured panels have hard coatings, show no discoloration and are resistant to both methyl ethyl ketone saturated cloth rubbing (30 double rubs) and contacts with water.

Example 4: Low Temperature Curing Ester Copolymers-Phenolic Condensates

| Charge (Grams) | Composition |
|---|---|
| 820 | Diglycidyl ether of bisphenol A having an epoxide equivalent weight of 900 |
| 310 | Conjugated 9–11 castor fatty acids |
| 310 | Tall oil fatty acids |
|  | Set Dean Stark trap with xylol. Heat to 150° C. to melt. Then add the following: |
| 60 | Xylol |
| 3 | Triethylamine |

-continued

| Charge (Grams) | Composition |
|---|---|
|  | Heat to 225° C. and hold for an acid value of 15-17. Cool to 125° C. and add the following solvent: |
| 1200 | 2-Butoxyethanol |
|  | Premix the following monomers and catalysts and add over 3 hours at 120-125° C. |
| 900 | Styrene |
| 20 | Acrylic acid |
| 300 | Monomer of Example 1 |
| 60 | Hydroxyethyl acrylate |
| 15 | Ditertiary-butyl peroxide |
| 45 | Cumene hydroperoxide |
| 20 | Tertiary-butyl mercaptan |
| 350 | 2-Butoxyethanol |
|  | Hold for one hour at 120° C. |
| 10 | Cumene hydroperoxide- add and hold for 1 hour. |
| 10 | Cumene hydroperoxide- add and hold for 2 hours. Add the following solvent and then cool. |
| 100 | 2-Butoxyethanol |

On addition of sufficient dimethylethanolamine to neutralize 100 percent of the acidity, the product is soluble in water. This water solution has added thereto 25 percent by weight (based on total copolymer) of a liquid heat-hardening benzoguanamine-formaldehyde condensate (American Cyanamid product trademarked XM-1123 may be used) and acidity is neutralized 100 percent with dimethylethanolamine. The neutralized solution is the pigmented with tatanium dioxide rutile to a pigment to binder ratio of 0.2:1 and deionized water is added to provide an aqueous solution having 10 percent solids content. This diluted solution is electrodeposited at the anode at 110 volts to deposit a film having a thickness of 0.6 mil and the film is curable at a temperature of about 50° F. (28° C.) below that usually needed. Thus, a cure for about 20 minutes at about 375° F. (190° C.) is used instead of at about 425° F.-450° F. (218°-232° C.), as is normally needed for the same degree of cure. Despite the reduced curing temperature, the cured coating has a pencil hardness of 4H and almost passed 80 inch pounds of reverse impact.

Using the decarboxylatable carboxylic acid monomers of this invention, the relatively low temperature cure of the composition is retained while substrate corrosion resistance is enhanced and film condition on immersion in water is improved.

I claim:

1. An addition polymerizable monoethylenically unsaturated carboxylic acid monomer which decarboxylates on heating and has the structural formula:

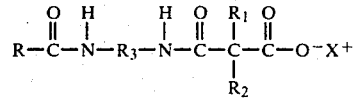

wherein R is a polymerizable monoethylenically unsaturated organic radical; $R_1$ and $R_2$ are selected from the group consisting of hydrogen and $C_1$-$C_4$ alkyl; $R_3$ is selected from the group consisting of $C_1$-$C_4$ divalent aliphatic groups; and $X^+$ is selected from the group consisting of the proton and protonated volatile amines.

2. The addition polymerizable carboxylic acid monomer according to claim 1, wherein R is selected from the group consisting of $H_2C=CH-$ and

$R_3$ is $-CH_2-$, and both $R_1$ and $R_2$ are the same.

3. An addition polymerizable monoethylenically unsaturated carboxylic acid which decarboxylates on heating having the formula:

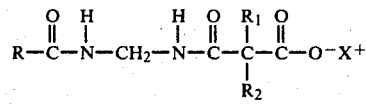

wherein R is selected from the group consisting of $H_2C=CH-$ and

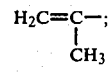

$R_1$ and $R_2$ are selected from the group consisting of hydrogen and $C_1$-$C_4$ alkyl, and both $R_1$ and $R_2$ are the same; and $X^+$ is selected from the group consisting of the proton and protonated volatile amines.

4. The addition polymerizable carboxylic acid monomer in accordance with claim 3, wherein $R_1$ and $R_2$ are hydrogen and $X^+$ is the proton.

5. The addition polymerizable carboxylic acid monomer in accordance with claim 3 which is selected from acrylamidomethylmalonamic acid and its salts with a volatile amine.

* * * * *